US011480351B2

(12) United States Patent
Oh et al.

(10) Patent No.: US 11,480,351 B2
(45) Date of Patent: Oct. 25, 2022

(54) AIR PURIFIER AND OPERATING METHOD OF THE SAME

(71) Applicant: LG Electronics Inc., Seoul (KR)

(72) Inventors: Ji Hye Oh, Seoul (KR); In Ho Lee, Seoul (KR); Jae Woong Jeong, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 384 days.

(21) Appl. No.: 16/709,415

(22) Filed: Dec. 10, 2019

(65) Prior Publication Data

US 2021/0063036 A1 Mar. 4, 2021

(30) Foreign Application Priority Data

Aug. 29, 2019 (KR) .................. 10-2019-0106681

(51) Int. Cl.
| | |
|---|---|
| G05B 21/00 | (2006.01) |
| F24F 11/30 | (2018.01) |
| G06K 9/62 | (2022.01) |
| H04L 12/28 | (2006.01) |
| H04L 67/12 | (2022.01) |
| F24F 7/00 | (2021.01) |
| G05B 13/02 | (2006.01) |
| F24F 8/10 | (2021.01) |
| F24F 110/65 | (2018.01) |

(52) U.S. Cl.
CPC ............... *F24F 11/30* (2018.01); *F24F 7/00* (2013.01); *F24F 8/10* (2021.01); *G05B 13/027* (2013.01); *G06K 9/6256* (2013.01); *H04L 12/282* (2013.01); *H04L 67/12* (2013.01); *F24F 2007/001* (2013.01); *F24F 2110/65* (2018.01)

(58) Field of Classification Search
CPC ........................................................ F24F 11/30
USPC ........................................................ 700/276
See application file for complete search history.

(56) References Cited

U.S. PATENT DOCUMENTS

| | | | | | |
|---|---|---|---|---|---|
| 6,135,201 | A | * | 10/2000 | Nonoyama | ........ B60H 1/00064 237/12.3 A |
| 9,346,060 | B2 | * | 5/2016 | Zhou | ........................ B03C 3/41 |
| 9,545,592 | B2 | * | 1/2017 | Chen | .................. B01D 46/0086 |
| 2009/0265037 | A1 | * | 10/2009 | Bassa | ....................... F24F 11/30 700/306 |

(Continued)

FOREIGN PATENT DOCUMENTS

| | | |
|---|---|---|
| KR | 10-2018-0049471 | 5/2018 |
| KR | 10-2018-0080404 | 7/2018 |

*Primary Examiner* — Evral E Bodden
(74) *Attorney, Agent, or Firm* — Fish & Richardson P.C.

(57) ABSTRACT

Disclosed is a method of operating an air purifier by executing an artificial intelligence (AI) algorithm and/or a machine learning algorithm in a fifth generation (5G) environment connected for the Internet of Things. A method for operating an air purifier comprises determining whether an indoor situation is a situation in which protection of a filter is necessary based on sensor information from at least one sensor, in response to a determination that the indoor situation is the situation in which protection of the filter is necessary, suspending an air purifying function, and operating one or more ventilation devices. According to the present disclosure, it is possible to protect the air purifier from a situation in which a life of the filter of the air purifier can be drastically shortened.

19 Claims, 8 Drawing Sheets

(56) References Cited

U.S. PATENT DOCUMENTS

2017/0154517 A1* 6/2017 Aliakseyeu ............. H04W 4/02
2019/0030202 A1* 1/2019 Yi ........................... A61L 9/205

* cited by examiner

| DETECTION SENSOR | IDENTIFIED EVENT | SCORE |
|---|---|---|
| IMAGE SENSOR (INCLUDING EXTERNAL IMAGE SENSOR) | COOKING<br>CLEANING<br>SMOKING | 20<br>20<br>50 |
| SOUND SENSOR (INCLUDING EXTERNAL SOUND SENSOR) | VACUUM CLEANER SOUND (HIGH LEVEL)<br>VACUUM CLEANER SOUND (LOW LEVEL)<br>KITCHEN HOOD SOUND<br>ROASTING OR FRYING SOUND | 40<br>10<br>10<br>40 |
| STOVE AREA SENSOR | USING GAS<br>SMOKE DETECTED<br>FLAME OR HEAT DETECTED | 10<br>40<br>10 |
| SMOKE DETECTOR | SMOKE DETECTED (HIGH LEVEL)<br>SMOKE DETECTED (LOW LEVEL) | 50<br>30 |
| AIR POLLUTION SENSOR | INDOOR AIR POLLUTION DEGREE IS HIGHER THAN THRESHOLD VALUE | 50 |

FIG. 6

AIR PURIFIER AND OPERATING METHOD OF THE SAME

CROSS-REFERENCE TO RELATED APPLICATION

This application claims benefit of priority to Korean Application No. 10-2019-0106681, filed on Aug. 29, 2019, the entire disclosure of which is incorporated herein by reference.

BACKGROUND

1. Technical Field

The present disclosure relates to an air purifier, and more particularly, to an air purifier that stops operation depending on the surrounding situation, and a method of operating the same.

2. Description of Related Art

An air purifier is a device that sucks contaminated air in a room, purifies the air using a filter, and discharges the purified air. In order to improve the operating performance of the air purifier, technologies for controlling the operation of the air purifier in consideration of an indoor situation have been developed.

Korean Patent Application Publication No. 10-2018-0080404 (related art 1) discloses a robot air purifier that senses dust-inducing noise using a sound sensor and moves to an area where dust-inducing noise occurs to perform an air purifying function.

Korean Patent Application Publication No. 10-2018-0049471 (related art 2) discloses a method of controlling an air purifier such that the air purifier recognizes a sound that causes air pollution using a microphone provided in the air purifier and further sucks air in a direction of sound generation.

Both related art 1 and related art 2 aim to detect an occurrence of air pollution through the sound and effectively remove air pollution. However, depending on the situation, the operation of the air purifier can drastically shorten a life of the filter of the air purifier. For example, cigarette smoke or oil mist generated during cooking greatly shortens the life of the filter of the air purifier. When the air purifier according to related art 1 or related art 2 operates in the above situation, the air purifier intensively sucks the cigarette smoke or the oil mist, and the life of the filter is shortened more drastically.

SUMMARY OF THE INVENTION

One object of the present disclosure is to protect an air purifier from a situation in which the life of the filter of an air purifier can be drastically shortened.

Another object of the present disclosure is to effectively remove a contaminant in a room while protecting the filter of an air purifier.

Another object of the present disclosure is to determine a trade-off between protection of the filter of the air purifier and removal of the contaminant in the room according to a preference of a user.

The objective of the present disclosure is not limited to the above-mentioned objectives and other objectives and aspects of the present disclosure which are not mentioned can be understood by the following description and will be more clearly understood by the embodiments of the present disclosure. It is also to be understood that the aspects of the present disclosure may be realized by means and combinations thereof set forth in claims.

A method of operating an air purifier and the air purifier according to embodiments of the present disclosure suspend an air purifying function or perform a ventilation operation according to an indoor situation identified using at least one sensor.

A method for operating an air purifier according to a first aspect of the present disclosure comprises determining whether an indoor situation is a situation in which protection of a filter is necessary based on sensor information from at least one sensor, in response to a determination that the indoor situation is the situation in which protection of the filter is necessary, suspending an air purifying function of the air purifier, and operating one or more ventilation devices.

An air purifier according to a second aspect of the present disclosure comprises a first airflow generator configured to generate an airflow such that outdoor air is introduced through a filter and filtered air is discharged, at least one sensor configured to detect at least one of an image, a sound or an air pollution degree in an indoor environment, and a controller configured to determine whether an indoor situation is a situation in which protection of a filter is necessary based on sensor information from at least one sensor, and in response to a determination that the indoor situation is the situation in which protection of the filter is necessary, suspend an operation of the first airflow generator, and operate one or more ventilation devices.

A home automation server according to a third aspect of the present disclosure comprises a network interface configured to communicate with an air purifier, one or more sensors, and one or more ventilation devices, and a processor configured to determine whether an indoor situation is a situation in which protection of a filter is necessary based on sensor information from at least one sensor, and in response to a determination that the indoor situation is the situation in which protection of the filter is necessary, transmit a signal for requesting suspension of an air purifying function to the air purifier, and transmit a signal for operating at least one ventilation device to the at least one ventilation device.

In an embodiment, the situation in which protection of the filter is necessary includes at least one of cooking, cleaning, smoking, or indoor air pollution greater than a threshold value.

In another embodiment, the sensor information from the sensor includes at least one of image information acquired by an image sensor, sound information acquired by a sound sensor, smoke detection information detected by a smoke sensor, gas usage information detected by a gas flow sensor, flame information detected by a flame sensor, heat information detected by a temperature sensor, and an indoor air pollution degree detected by an air pollution sensor.

In an additional embodiment, whether the situation is the situation in which protection of the filter is necessary is determined using an artificial neural network (ANN) that has been trained in advance to detect cooking, cleaning, or smoking events based on image data or sound data.

In an additional embodiment, the ventilation device includes a window opening device or a door opening device that controls opening and closing of a window or a door.

In an additional embodiment, the ventilation device includes an air circulator, and a blowing direction of the air circulator is determined based on a location at which a filter life shortening material is generated and a location of an opened window or door.

In an additional embodiment, when the indoor air pollution degree is lower than a reference value after the ventilation operation, an operation of the ventilation device is returned to an original state and the air purifying function is restarted.

In an additional embodiment, when a ventilation operation of the user is detected, a reference value for restarting the air purifying function is adjusted based on an indoor air pollution degree during the ventilation operation of the user.

According to the present disclosure, it is possible to protect the air purifier from a situation in which the life of the filter of the air purifier can be drastically shortened by monitoring the indoor environment.

In addition, according to the present disclosure, by using a home network such as home IoT and artificial intelligence technology, it is possible to more accurately estimate a situation in which the life of the filter of the air purifier can be drastically shortened in the indoor environment.

In addition, according to the present disclosure, by learning the reference value for the operation of the air purifier according to a feedback of the user, the air purifier can be operated more conveniently for the user.

BRIEF DESCRIPTION OF THE DRAWINGS

The above and other aspects, features, and advantages of the present disclosure will become apparent from the detailed description of the following aspects in conjunction with the accompanying drawings, in which:

FIG. 6 illustrates an illustrative score map for mapping scores for each event in accordance with an embodiment of the invention;

DETAILED DESCRIPTION

Figure 1:
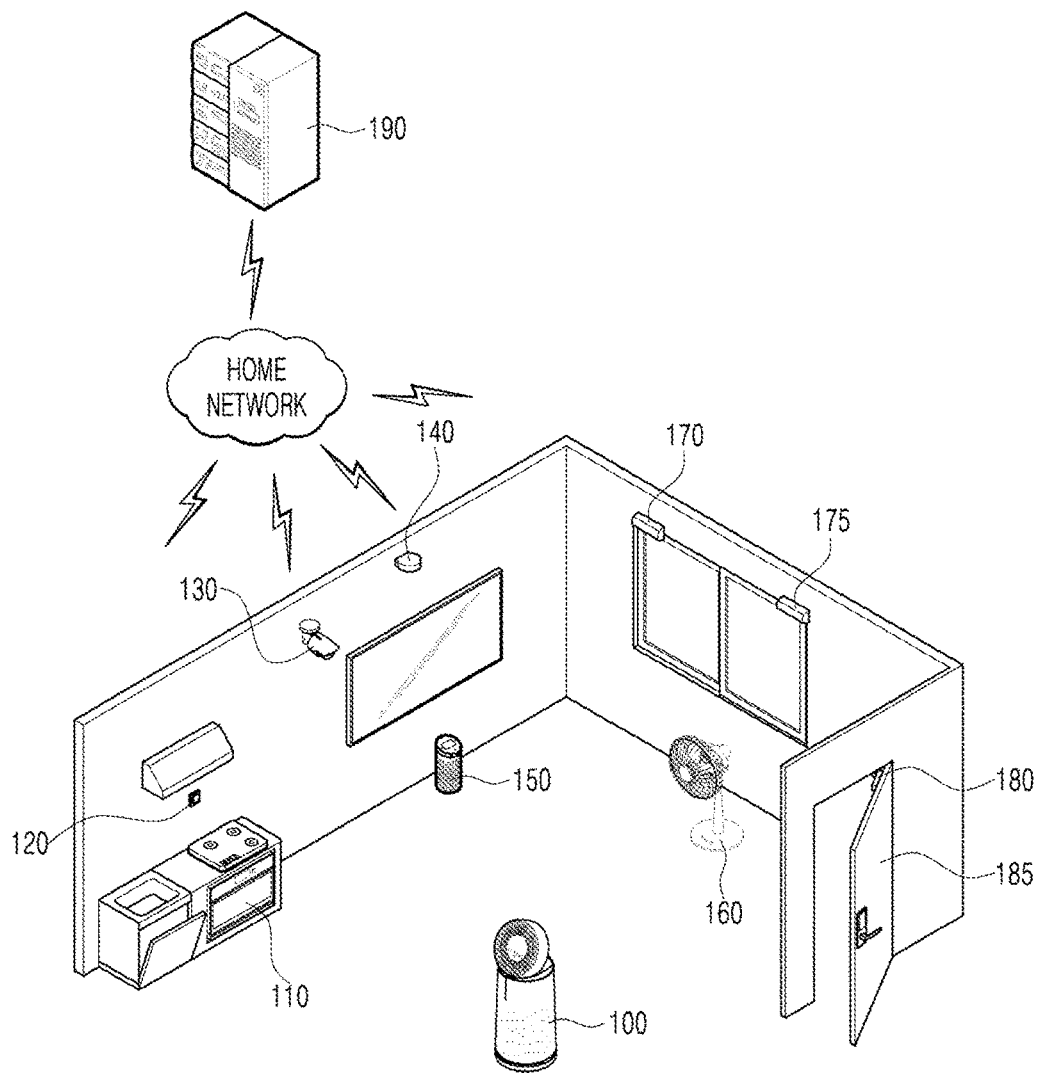
FIG. 1 is a diagram illustrating an illustrative indoor environment in which an air purifier according to an embodiment of the present disclosure is disposed.

The advantages and features of the present disclosure and ways to achieve them will be apparent by making reference to embodiments as described below in detail in conjunction with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Although the terms "ordinal numbers" such as first, second and the like are used to describe various structural elements, the structural elements should not be defined by the terms. The terms are used merely for the purpose to distinguish an element from the other elements.

As described herein, ANN is a data processing system modelled after the mechanism of biological neurons and interneuron connections, in which a number of neurons, referred to as nodes or processing elements, are interconnected in layers. ANNs are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections and acquires problem-solving capability as the strengths of synaptic interconnections are adjusted throughout training. An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a previous layer.

An ANN may include a deep neural network (DNN). Specific examples of the DNN include a convolutional neural network (CNN), a recurrent neural network (RNN), a deep belief network (DBN), and the like, but are not limited thereto.

An ANN may be classified as a single-layer neural network or a multi-layer neural network, based on the number of layers therein.

In general, a single-layer neural network may include an input layer and an output layer.

Further, in general, a multi-layer neural network may include an input layer, one or more hidden layers, and an output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

In the meantime, a deep neural network with a plurality of hidden layers between the input layer and the output layer may be the most representative type of artificial neural network which enables deep learning, which is one machine learning technique.

The Artificial Neural Network can be trained by using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

In the meantime, the training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

FIG. 1 is a diagram illustrating an illustrative indoor environment in which an air purifier according to an embodiment of the present disclosure is disposed.

In the present disclosure, an "indoor environment" refers to an indoor space where an air purifier 100 is disposed and where an operation of the air purifier 100 may affect. For example, the indoor environment may be an indoor environment of a home. The indoor environment may be surrounded by a wall having a window 175 and a door 185 that may open to an exterior space.

A kitchen stove 110, a stove area sensor 120, a home security camera 130, a smoke detector 140, an artificial intelligence (AI) speaker 150, an air circulator 160, a window opening device 170, a door opening device 180, and a smart home server 190 may be disposed in the indoor environment.

The kitchen stove 110 is a device that generates heat or flame for cooking, and comprises at least one of a gas range, a gas oven, an electric range, a halogen range, an induction range, or a cooktop.

The stove area sensor 120 is a sensor device for detecting flame, smoke, heat, or the use of gas in the vicinity of kitchen stove 110. The stove area sensor 120 may be installed on the kitchen stove 110, installed on a wall near the kitchen stove 110, or installed on a kitchen hood disposed above the kitchen stove 110. The stove area sensor 120 may comprise a flame sensor, a smoke sensor, a temperature sensor, or a gas flow sensor. The stove area sensor 120 may notify the smart home server 190 of detected sensor information regarding flame, smoke, temperature, or the use of gas through a network interface.

For example, the home security camera 130 is a device for acquiring an image of the indoor environment by being attached to a wall or a ceiling of the room. The home security camera 130 may store a recorded image on the smart home server 190 or an external cloud server through a network interface. In addition, the home security camera 130 may stream an image obtained to a user terminal (for example, a personal computer or a mobile phone) through the smart home server 190 or through the external cloud server.

For example, the smoke detector 140 is a device for detecting smoke generated in the indoor environment by being attached to a wall or ceiling of the room. For example, the smoke detector 140 may detect cigarette smoke when the user smokes indoors. The smoke detector 140 notifies the smart home server 190 of detection of the smoke through the network interface.

The AI speaker 150 is a device that detects ambient sound, in particular, a voice of the user, analyzes the meaning of the voice of the user, and performs control according to a request of the user.

The stove area sensor 120, the home security camera 130, the smoke detector 140, and the AI speaker 150 may operate as external sensor devices for providing sensor information to the air purifier 100 in addition to the sensors provided in the air purifier 100 in the present disclosure. The sensor information from the external sensor devices 120, 130, 140, and 150 may be directly transmitted to the air purifier 100 or may be transmitted to the smart home server 190 so that the smart home server 190 may provide the sensor information to the air purifier 100. For example, the stove area sensor 120 may transmit sensor information indicating whether the kitchen stove 110 is operating to the air purifier 100, and the home security camera 130 may transmit an acquired indoor image to the air purifier 100. The smoke detector 140 may notify the air purifier 100 of generation of smoke (for example, cigarette smoke) in an indoor environment. The AI speaker 150 may transmit the detected sound to the air purifier 100.

The air circulator 160 is a device that generates airflow in the air so that the air circulates. The window opening device 170 is a device for opening or closing the window 175 in response to a control signal or request from the smart home server 190 or from other devices (for example, the air purifier 100). The door opening device 180 is a device for opening or closing the door 185 in response to a control signal or request from the smart home server 190 or from other devices.

The air circulator 160, the window opening device 170, and the door opening device 180 may operate as ventilation devices for ventilating air in the indoor environment in the present disclosure. The ventilation devices 160, 170, and 180 may control operations thereof according to a request from the smart home server 190 or from other devices, in particular, the air purifier 100. For example, the air circulator 160 may blow air in a requested direction in response to a request from the air purifier 100, and the window opening device 170 or the door opening device 180 may open the window 175 or the door 185 to allow outdoor air to enter the indoor environment in response to a request from the air purifier 100.

The smart home server 190 is a server of an automation system for establishing a home network by being connected to one or more devices (for example, home IoT devices) and a user terminal (not illustrated) installed in the indoor environment and controlling and managing devices connected to the home network. The smart home server 190 may receive and manage operation state information or sensor information from one or more devices connected to the home network.

In addition, the smart home server 190 may transmit, to one or more devices connected to the home network, a control signal for controlling operations thereof. For example, the smart home server 190 can receive sensor information from the external sensor devices 120, 130, 140, and 150, and transmit control signals for controlling operations of the ventilation devices 160, 170, and 180 to the ventilation devices 160, 170, and 180. The smart home server 190 can provide sensor information from the sensor devices 120, 130, 140, and 150 to the air purifier 100 or the user terminal, and transmit control signals for controlling operations of the ventilation devices 160, 170, and 180 to the ventilation devices 160, 170, and 180 according to a request from the air purifier 100 or from the user terminal.

The aforementioned devices, in particular, the air purifier 100, the external sensor devices 120, 130, 140, and 150, the ventilation devices 160, 170, and 180, and the smart home server 190 have network functionality, and can be connected to each other wirelessly or by wire and directly, or indirectly via other devices to form a home network. One or more devices include a network interface for communicating with other devices or the smart home server 190, and the network interface can use, for example, one or more of a fifth generation (5G) cellular network, Bluetooth, Infrared Data Association (IrDA), Internet of Things (IoT), Local Area Network (LAN), Low Power Network (LPN), Low Power Wide Area Network (LPWAN), Personal Area Network (PAN), Radio Frequency Identification (RFID), Ultra-wide Band (UWB), Wireless Fidelity (Wi-Fi), Wireless LAN (WLAN), or ZigBee communication technologies, but not limited thereto.

One or more devices may notify other devices directly or via one or more intermediary devices. The intermediary device may be any of the devices described above or may be a separate network device such as a gateway, a hub, a switch, a router, a small cell, a femtocell, a picocell, or a wireless access point (WAP).

One or more devices can identify relative positions (for example, directions and/or distances) with respect to other devices or absolute locations thereof in the indoor environment through communication with each other. For example, one or more devices can perform direct communication with other devices, and estimate directions and distances with respect to other devices using the signal strength according to a beamforming direction and latency of a communication message. The smart home server 190 can collect relative location information from the devices and identify absolute locations of the devices in the indoor environment. In another embodiment, the smart home server 190 can identify the locations of the devices in the indoor environment by manual input by the user.

Figure 2:
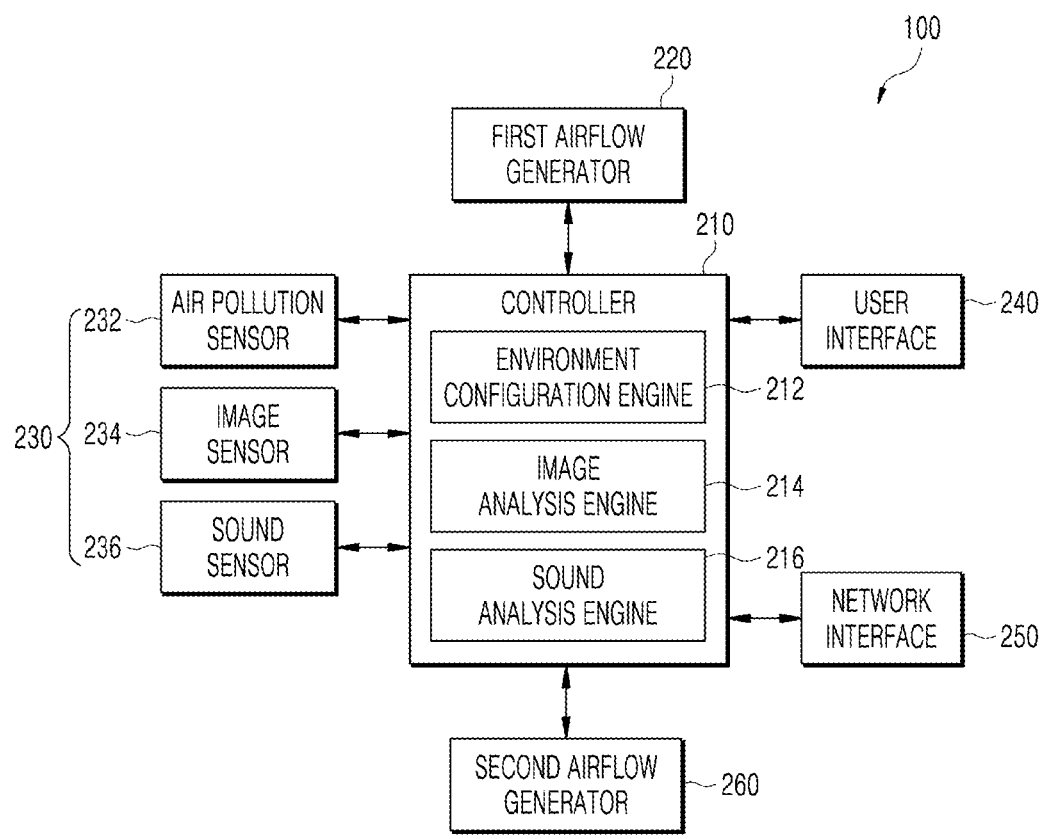
FIG. 2 is a block diagram schematically illustrating the air purifier according to the embodiment of the present disclosure.
Figure 3A:
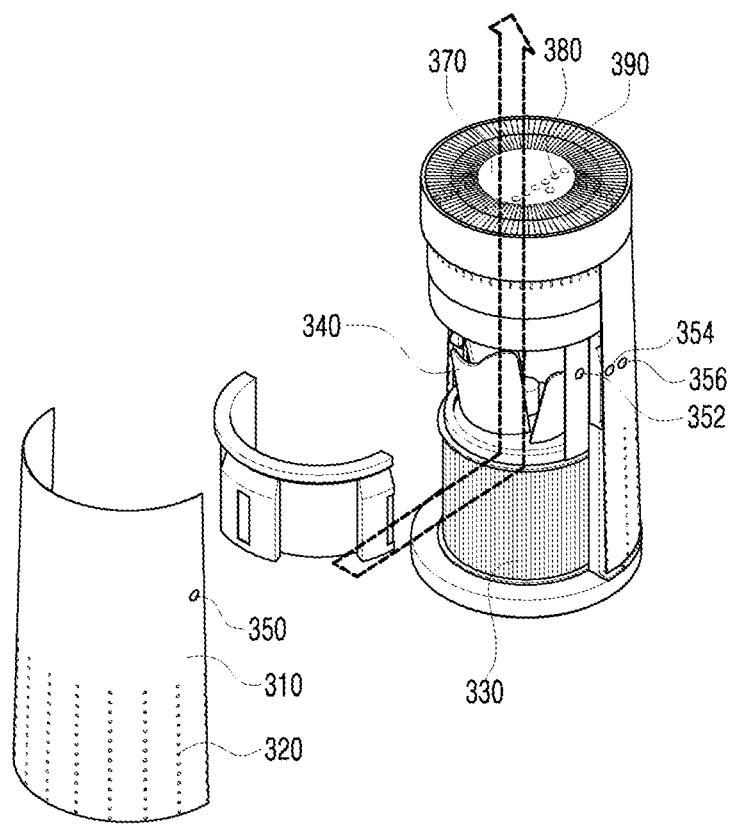
FIG. 3A and FIG. 3B are perspective views illustrating the air purifier according to the embodiment of the present disclosure.
Figure 3B:
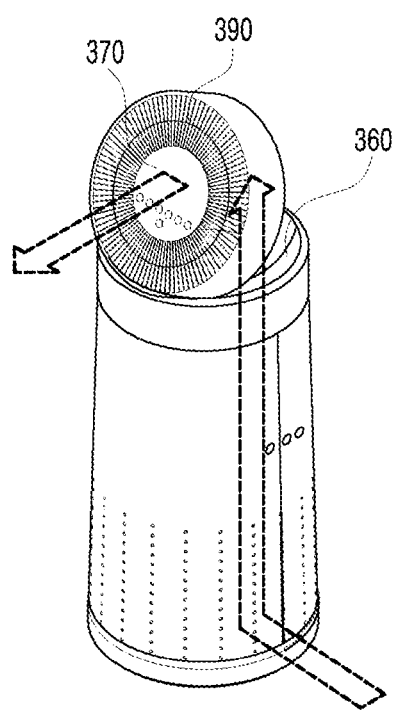

FIG. 2 is a block diagram schematically illustrating the air purifier according to the embodiment of the present disclosure, and FIG. 3A and FIG. 3B are perspective views illustrating the air purifier according to the embodiment of the present disclosure.

The air purifier 100 includes a controller 210, a first airflow generator 220, at least one sensor unit 230, a user interface 240, a network interface 250, and a second airflow generator 260.

The first airflow generator 220 generates an airflow such that air is introduced into the air purifier 100 through an inlet 320 formed in a housing 310 of the air purifier 100, the introduced air passes through a filter 330, and the filtered air is discharged to the outside of the air purifier 100 through an outlet 360. The first airflow generator 220 includes a first fan 340 disposed inside the housing 310 of the air purifier 100. The first fan 340 may be located downstream of the filter 330 in a direction of the airflow. An air purifying function of the air purifier 100 is performed by an operation of the first airflow generator 220.

The sensor unit 230 generates sensor information by monitoring a state of the indoor environment or a state around the air purifier 100 and provides the generated sensor information to the controller 210. The sensor unit 230 may comprise, for example, an air pollution sensor 232, an image sensor 234, or a sound sensor 236. The sensor unit 230 may be placed in any suitable location to achieve a function. For example, the sensor unit may be disposed at positions 352, 354, and 356 of an air purifier body exposed through a through-hole 350 of the housing 310.

The air pollution sensor 232 measures a pollution degree of air in the indoor environment around the air purifier 100 to generate pollution data and provides the generated pollution data to the controller 210. The image sensor 234 is, for example, a camera that acquires an image of the indoor environment around the air purifier 100, generates image data, and provides the generated image data to the controller 210. The sound sensor 236 is, for example, a microphone that acquires ambient sound to generate sound data and provides the generated sound data to the controller 210.

The user interface 240 includes a display panel 370 for displaying information related to the operation of the air purifier 100 (for example, an operation level of the air purifier 100 or the air pollution degree measured by the air pollution sensor 232) and buttons 380 or a touch screen for receiving input from the user.

The network interface 250 provides network functionality for communicating with at least one of the smart home server 190, the external sensor devices 120, 130, 140, and 150, the ventilation devices 160, 170, and 180, the user terminal, or the Internet. The network interface 250 can use, for example, one or more of a 5G cellular network, Bluetooth, IrDA, IoT, LAN, LPN, LPWAN, PAN, RFID, UWB, Wi-Fi, WLAN, or ZigBee communication technologies, but not limited thereto.

The network interface 250 may receive sensor information from the external sensor devices 120, 130, 140, and 150. For example, the network interface 250 may receive information regarding the flame, smoke, or temperature of the kitchen stove 110 from the stove area sensor 120. The network interface 250 may receive image data of the indoor environment and orientation information of the home security camera 130 from the home security camera 130. The network interface 250 may receive information regarding generation of smoke in the indoor environment from the smoke detector 140. Also, the network interface 250 may receive information regarding an outdoor air pollution degree from an external server via the Internet.

The second airflow generator 260 includes a second fan 390 disposed outside the housing 310 and near the outlet 360 of the air purifier 100. The second fan 390 is positioned at a first position adjacent to the outlet 360 in a first operation mode (FIG. 3A) to assist in discharging the air filtered by the filter 330 to the outside of the air purifier 100. In other words, the second airflow generator 260 may assist generation of the airflow by the first airflow generator 220. The second fan 390 may be positioned at a second position away from the outlet 360 in a second operation mode (FIG. 3B) to generate an airflow that does not pass through the filter 330 of the air purifier 100. For example, the second airflow generator 260 may function as an air circulator independently of the air purifying function of the air purifier 100.

The controller 210 controls the operation of the first airflow generator 220 and/or the second airflow generator 260 by manipulation of the user through the user interface 240. The controller 210 may control the operation of the second airflow generator 260 to assist generation of a flow of air by the first airflow generator 220 or control the operation of the second airflow generator 260 to generate a flow of air irrelevant to the first airflow generator 220.

The controller 210 may receive sensor information from one or more sensor units 230 or from one or more external sensor devices 120, 130, 140, and 150 via the network interface 250, and control the operation of the first airflow generator 220 and/or the second airflow generator 260 based on the received sensor information. For example, when the air pollution degree of the indoor environment is higher than a reference value, the controller 210 may generate a control signal for driving the first airflow generator 220.

In addition, the controller 210 may control the operation of the first airflow generator 220 and/or the second airflow generator 260 in response to a request from an external device such as the user terminal or the smart home server 190 received through the network interface 250. The controller 210 may request that one or more external ventilation devices 160, 170, and 180 perform an operation for ventilation through the network interface 250.

The controller 210 may include an environment configuration engine 212 that enables the user to set environment configurations related to the operation of the air purifier 100. For example, the environment configuration engine 212 may provide an environment configuration page that allows the user to access the page using the user terminal and allows the user to set environment configurations. In addition, the environment configuration engine 212 may allow the user to set environment configurations through the user interface 240.

The environment configuration engine 212 allows the user to set conditions for starting or ending the air purifying function. In addition, the environment configuration engine 212 allows the user to set (for example, add, delete, or correct) a situation in which the air purifying function (the operation of the first airflow generator) needs to be suspended since protection of the filter 330 is required.

For example, the situation in which protection of the filter 330 is required may correspond to cooking, smoking, cleaning, or excessive air pollution in the room. When oil mist generated during cooking is adsorbed to the filter 330 of the air purifier 100, the life of the filter 330 may be drastically shortened. A lot of chemicals in smoke generated during smoking dramatically shorten the life of the filter 330. Fine dust generated during cleaning (particularly when a vacuum cleaner is used) may drastically shorten the life of the filter 330. Therefore, it is preferable to suspend the air purifying function of the air purifier and to ventilate through opening of the window, etc. during cooking, smoking, or cleaning.

In addition, when a pollution degree of indoor air is excessively higher than that of outdoor air, it may be more advantageous for extension of the life of the filter to open the window and ventilate rather than operating the air purifier. Using the air purifier when the window or the door is open and outdoor air is flowing in may only shorten the life of the filter and have little air purifying effect. In this case, it is preferable to suspend the air purifier.

The controller 210 may include an image analysis engine 214 for analyzing image data received from the image sensor 234 or from an external image sensor device (for example, the home security camera 130) and a sound analysis engine 216 for analyzing sound data received from the sound sensor 236 or from an external sound sensor device (for example, the AI speaker 150).

The controller 210 may include any type of processor implemented in hardware having a structured circuit for performing functions represented by codes or instructions included in a memory and a program stored in the memory. The controller 210 may include, for example, one or more of a microprocessor, a central processing unit (CPU), a processor core, a multiprocessor, an application-specific integrated circuit (ASIC), a field programmable gate array (FPGA), an image processing unit (IPU), or a neural processing unit (NPU). Each of the environment configuration engine 212, the image analysis engine 214, and the sound analysis engine 214 described above may include a memory and a processor or may be configured by allocation of resources of the memory and the processor.

Figure 4A:
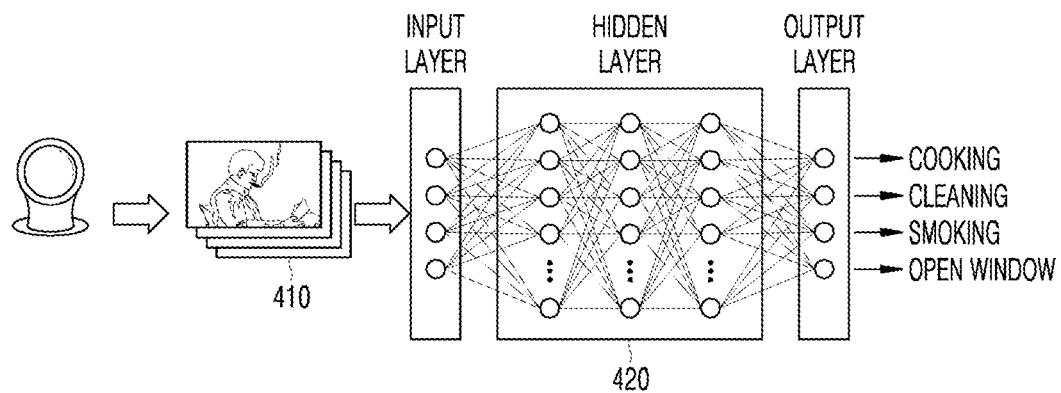
FIG. 4A and FIG. 4B are diagrams schematically illustrating operations of an image analysis engine and a sound analysis engine according to an embodiment of the present disclosure.
Figure 4B:
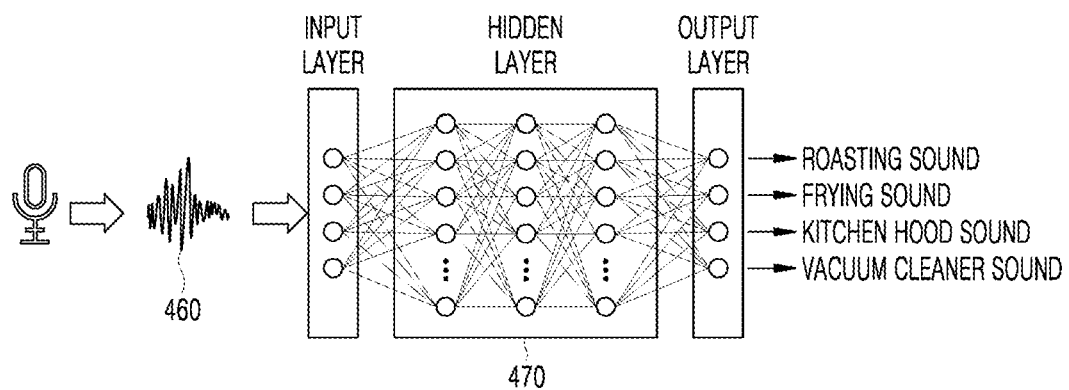

FIG. 4A and FIG. 4B are diagrams schematically illustrating operations of the image analysis engine and the sound analysis engine according to an embodiment of the present disclosure.

The image analysis engine 214 includes an ANN 420 that has been trained in advance using machine learning to identify events (for example, user behavior) occurring in the indoor environment from input image data 410. The ANN 420 has been trained in advance to identify an event in which a material shorting the life of the filter is generated, especially in the indoor environment. For example, the ANN 420 may have been trained in advance to identify that the user is cooking, the user is cleaning, the user is smoking, or the user is opening the window or the door. In addition, for example, the ANN 420 may have been trained in advance to identify that smoke is generated in the indoor environment or that the window or the door is open. The image analysis engine 214 may obtain orientation information of the image sensor 234 to estimate a location or a direction at or in which the identified event occurs.

The sound analysis engine 216 includes an ANN 470 that has been trained in advance using machine learning to identify events occurring in the indoor environment from input sound data 460. The ANN 470 has been trained in advance to identify an event in which a material shorting the life of the filter is generated, especially in the indoor environment. For example, the ANN 470 may have been trained in advance to identify operation sound of the kitchen hood, sound of roasting or frying, operation sound of the vacuum cleaner, etc. In addition, the sound analysis engine 216 may perform preprocessing to remove human voice before inputting sound data received from the sound sensor 236 or from an external sensor device to the ANN.

In addition, the sound analysis engine 216 may determine a sound level of identified sound. For example, the sound analysis engine 216 may identify whether the operation sound of the vacuum cleaner is greater or less than a pre-learned level. The sound analysis engine 216 may estimate a location or a direction at or in which the event occurs based on signal latency in sound data from the plurality of sound sensors 236 or orientation information of the sound sensor 236.

Figure 5:
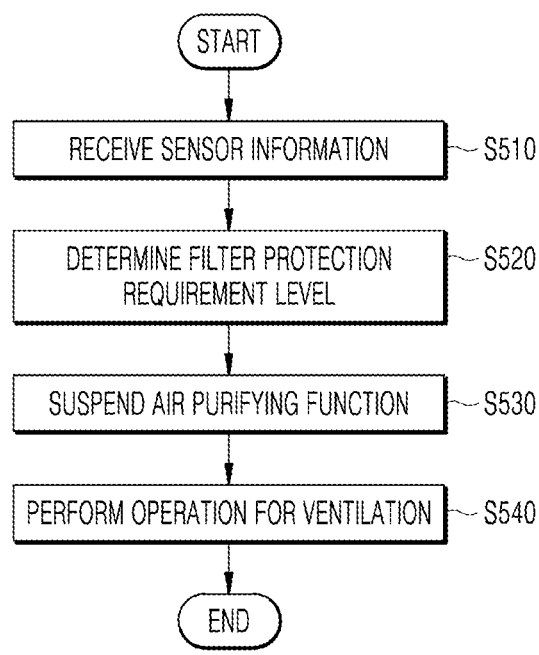
FIG. 5 is a flowchart illustrating an illustrative method of operating the air purifier in accordance with an embodiment of the present disclosure.

FIG. 5 is a flowchart illustrating an illustrative method of operating the air purifier in accordance with an embodiment of the present disclosure.

Reception of Sensor Information

In step S510, the controller 210 receives sensor information from the sensor units 230 provided in the air purifier 100. The controller 210 may receive sensor information directly from the external sensor devices 120, 130, 140, and 150 disposed in the indoor environment or by mediation of the smart home server 190. The controller 210 may receive sensor information of the external sensor devices 120, 130, 140, and 150 from the smart home server 190. The controller 210 may receive sensor information from an external server via the Internet.

The sensor information received by the controller 210 may include at least one of an air pollution degree measured by the air pollution sensor 232, image data acquired by the image sensor 234, orientation information of the image sensor 234, sound data acquired by the sound sensor 236, orientation information of the sound sensor 236, an operation state of the kitchen stove 110 acquired by the stove area sensor 120, image data and direction information of an image acquired by the home security camera 130, information about smoke detected by the smoke detector 140, sound data and direction information of sound acquired by the AI speaker 150, or an outdoor air pollution degree provided by an external server.

Determination of Filter Protection Requirement Level

In step S520, the controller 210 determines a filter protection requirement level based on the received sensor information. The filter protection requirement level is a measure of a degree indicating how much an indoor situation is related to a situation in which protection of the filter is necessary based on the received sensor information. The controller 210 assigns scores to events identified from the respective sensors with reference to the score map. FIG. 6 illustrates an illustrative score map that maps scores for each event.

When a plurality of events are identified by a plurality of sensors, the controller 210 may sum up the plurality of scores for the plurality of events. The controller 210 determines the filter protection requirement level based on the summed score. For example, the filter protection requirement level may be determined to be "very high" when the sum score is greater than 100, the filter protection requirement level may be determined to be "high" when the sum score is greater than 70, the filter protection requirement level may be determined to be "normal" when the sum score is in a range of 30 to 70, and the filter protection requirement level may be determined to be "low" when the sum score is less than 30.

A reference score for determining the scores and/or the filter protection requirement level for each event may be modified by the user using the environment configuration engine 212.

Suspension of Air Purifying Function

When it is determined that protection of the filter is required, the controller 210 suspends the air purifying function in step S530. For example, when the filter protection requirement level is "normal", "high", or "very high", the controller 210 suspends the air purifying function. To suspend the air purifying function, the controller 210 suspends the operation of the first airflow generator 220 so that no airflow passing through the filter 330 is generated. As the air purifying function is suspended, oil mist generated during cooking, cigarette smoke, excessive contaminants, etc. are prevented from passing through the filter 330, and a drastic shortening of the life of the filter 330 is prevented.

Performance of Operation for Ventilation

Figures 7, 8:
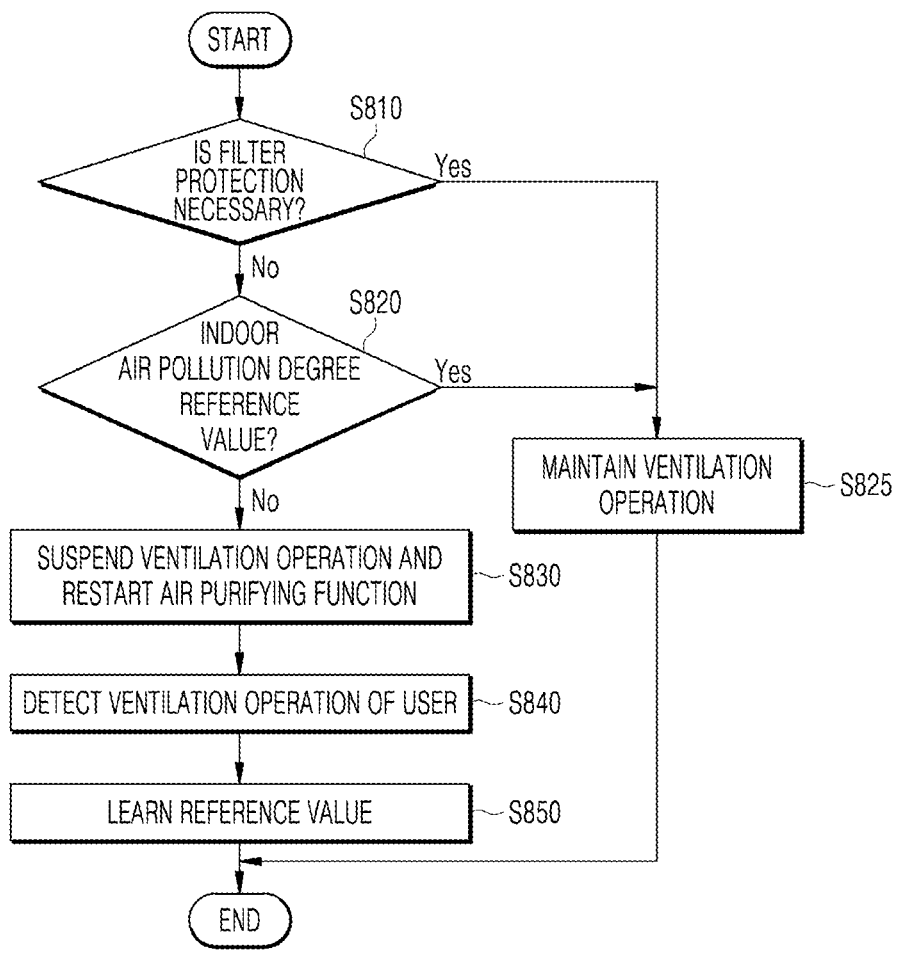
FIG. 7 is a table illustrating an example of a ventilation operation to be performed according to a filter protection requirement level according to an embodiment of the present disclosure.
FIG. 8 is a flowchart illustrating an illustrative method of operating the air purifier after the ventilation operation in accordance with an embodiment of the present disclosure.

In step S540, the controller 210 performs an operation for ventilation in addition to suspending the air purifying function. FIG. 7 is a table illustrating an example of ventilation operations to be performed according to the filter protection requirement level in accordance with an embodiment of the present disclosure. In one embodiment, the controller 210 performs an operation for opening the window 175 or the door 185 so that outdoor air is introduced. For example, the controller 210 transmits a request for opening the window 175 or the door 185 to the window opening device 170 or the door opening device 180. The request may be directly transmitted to the window opening device 170 or the door opening device 180 via the network interface 250, or the request may be transmitted to the smart home server 190 so that the smart home server 190 transmits a control signal to the window opening device 170 or the door opening device 180.

Opening of the window 175 or the door 185 may be performed based on an indoor air pollution degree and an outdoor air pollution degree. For example, the controller 210 opens the window 175 or the door 185 only when the air pollution degree measured by the air pollution sensor 232 is higher than the outdoor air pollution degree received from the external server. In addition, opening of the window 175 or the door 185 may be performed based on the filter protection requirement level. For example, the controller 210 opens only some windows or doors when the filter protection requirement level is "normal" or "high" and opens all windows and doors that can be opened when the filter protection requirement level is "very high".

By opening the window 175 or the door 185, oil mist, cigarette smoke, or excessive contaminants in the room may be discharged to the outside, and outdoor air may be introduced into the room. Accordingly, the indoor air quality can be improved without operating the air purifying function of the air purifier 100.

In addition to opening the window or the door, the controller 210 may perform a control operation such that the second airflow generator 260 operates in the second operation mode (that is, as an independent air circulator). That is, the second fan 390 of the second airflow generator 260 may be located away from the outlet 360 to generate an airflow not passing through the filter 330. In this instance, the controller 210 may determine a blowing direction of the second airflow generator 260 based on an occurrence position of the event (a position of a pollutant) estimated by the image analysis engine 214 or the sound analysis engine 216 and the position of the window or door opened. For example, the controller 210 may determine the blowing direction of the second airflow generator 260 so that air flows toward the window or the door opened from the pollutant. In addition, the controller 210 may determine a blowing intensity of the second airflow generator 260 based on the air pollution degree measured by the air pollution sensor 232.

The controller 210 may request an operation of the separate air circulator 160. The controller 210 may directly transmit the request to the air circulator 160 or transmit the request to the smart home server 190 so that the smart home server 190 generates a control signal for operating the air circulator 160. In this instance, the controller 210 may determine a blowing direction of the air circulator 160 based on the position of the pollutant estimated by the image analysis engine 214 or the sound analysis engine 216 and the position of the opened window or door, and determine a blowing intensity of the air circulator 160 based on an air pollution degree measured by the air pollution sensor 232. The controller 210 may include the determined blowing direction and blowing intensity in an operation request message of the air circulator.

Whether to operate the air circulator may be determined based on the filter protection requirement level. For example, the controller 210 operates the air circulator only when the filter protection requirement level is "high" or "very high".

FIG. 8 is a flowchart illustrating an illustrative method of operating the air purifier after the ventilation operation in accordance with an embodiment of the present disclosure.

Determination of Filter Protection Requirement Level after Ventilation

In step S810, the controller 210 determines the filter protection requirement level after ventilation. Processes for determining the filter protection requirement level after ventilation are substantially the same as the processes in step S520. When it is determined that the filter needs to be protected (for example, when the user is cooking), the controller 210 continues the ventilation operation being performed in step S825. When the filter protection requirement level is changed, the controller 210 may perform a ventilation operation according to the changed filter protection requirement level.

Measurement of Indoor Air Pollution Degree

When it is determined that protection of the filter is not required (for example, the filter protection requirement level is "normal" or "low") in step S820, the controller 210 measures the indoor air pollution degree after ventilation using the air pollution sensor 232 and determines whether the indoor air pollution degree is lower than a reference value. The reference value is an air pollution degree for determining whether to end the ventilation operation and restart the air purifying function.

A criterion for restarting the air purifying function is preferably different from a criterion for suspending the air purifying function. When these criteria are the same, the air purifier 100 may repeat suspension and restart of the air purifying function as the air pollution degree slightly varies in the vicinity of the criterion. Therefore, in one embodiment, even when the filter protection requirement level determined in step S810 has a level at which the air purifying function may be operated, the controller 210 determines whether to restart the air purifying function based on the indoor air pollution degree. When the indoor air pollution degree is higher than the reference value, the controller 210 continues the ventilation operation being performed in step S825.

Restart of Air Purifying Function

When the indoor air pollution degree is lower than the reference value, the controller 210 may restart the air purifying function in step S830. In addition, the controller 210 returns the operations for ventilation performed in step S540 to the original state. For example, when the window 175 or the door 185 is opened in step S540, the controller 210 transmits a request for closing the window 175 or the door 185 to the window opening device 170 or the door opening device 180.

When the second airflow generator 260 is operated as an air circulator or an external air circulator is operated in step S540, the controller 210 transmits a request for suspending the operation of the second airflow generator 260 or suspending the operation of the external air circulator.

Detection of Ventilation Operation of User

In step S840, the controller 210 detects a ventilation operation of the user occurring within a predetermined time after ventilation. The controller 210 detects the ventilation operation of the user by analyzing image data from the image sensor 234 or an external image sensor (for example, the home security camera 130) using the image analysis engine 214. The controller 210 may detect the ventilation operation of the user by a notification from the smart home server 190. For example, the smart home server 190 can notify the air purifier 100 that the window 175 or the door 185 is open. For example, the ventilation operation of the user means that that the user opens the window or the door, the user operates the air circulator, or the user operates the second airflow generator 260 of the air purifier 100, which are operations performed in step S540.

Learning to Close Ventilation Operation of User

Performing the ventilation operation by the user within a predetermined time (for example, 5 minutes) after ending the ventilation operation by the controller 210 may mean that the reference value for restarting the air purifying function does not meet the preference of the user. Therefore, in operation S850, the controller 210 may learn a reference value for performing the ventilation operation later based on the ventilation operation of the user.

In one embodiment, when the controller 210 detects a ventilation operation of the user, the controller 210 decreases a reference value for suspending the ventilation operation. Accordingly, the controller 210 can suspend the ventilation operation using the reduced reference value when the ventilation operation is suspended later.

In another embodiment, the controller 210 measures an air pollution degree when the user ends the ventilation operation and restarts the air purifying function, and changes a reference value for restarting the air purifying function based on the measured air pollution degree. For example, the controller 210 can set the reference value for restarting the air purifying function to an air pollution degree at which the user suspends the ventilation operation. In another example, the controller 210 may set, as a new reference value, an average of the air pollution degree at which the user suspends the ventilation operation and a currently set reference value. In still another example, the controller 210 may assign weights to the air pollution degree at which the user suspends the ventilation operation and the currently set reference value and set a weighted average thereof as the new reference value.

In the above, methods for operating the air purifier 100 have been described as being executed by the controller 210 of the air purifier 100. However, the above-described methods may be performed by a processor of the smart home server 190 in place of the controller 210. For example, the smart home server 190 may include an environment configuration engine that allows the user to set environment configurations related to the operation of the air purifier 100, an image analysis engine for analyzing image data received from the image sensor 234 of the air purifier or from an external image sensor device (for example, the home security camera 130), and a sound analysis engine for analyzing sound data received from the sound sensor 236 or from an external sound sensor device (for example, the AI speaker 150).

The smart home server 190 can receive sensor information from the sensor units 230 included in the air purifier 100, from external sensor devices 120, 130, 140, and 150 disposed in the indoor environment, or from an external server via the Internet. The sensor information may include at least one of an air pollution degree measured by the air pollution sensor 232, image data obtained by the image sensor 234, orientation information of the image sensor 236, sound data acquired by the sound sensor 236, orientation information of the sound sensor 236, an operation state of the kitchen stove 110 acquired by the stove area sensor 120, image data and direction information of an image acquired by the home security camera 130, information about smoke detected by the smoke detector 140, sound data and direction information of sound acquired by the AI speaker 150, or an outdoor air pollution degree provided by an external server.

The smart home server 190 may sum up the determined scores for the events identified from the respective sensors with reference to the score map and determine the filter protection requirement level based on the summed score.

When it is determined that protection of the filter is required, the smart home server 190 may transmit a signal requesting suspension of the air purifying function to the air purifier 100. In addition, the smart home server 190 may transmit a signal requesting the ventilation operation to one or more ventilation devices.

The smart home server 190 may determine the filter protection requirement level after ventilation, measure the indoor air pollution degree after the ventilation, and determine whether the indoor air pollution degree is lower than a reference value.

When the indoor air pollution degree is lower than the reference value, the smart home server 190 can transmit a signal requesting restart of the air purifying function to the air purifier 100. In addition, the smart home server 190 can return ventilation operations of one or more ventilation devices to original states.

The smart home server 190 can detect a ventilation operation of the user occurring within a predetermined time after the ventilation and learn a reference value for performing the ventilation operation later based on the ventilation operation of the user.

The example embodiments described above may be implemented through computer programs executable through various components on a computer, and such computer programs may be recorded on computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," "such as") used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is not limited to the example embodiments described above, and rather intended to include the following appended claims, and all modifications, equivalents, and alternatives falling within the spirit and scope of the following claims.

What is claimed is:

1. A method for operating an air purifier, comprising:
    determining, by a processor that is configured to control the air purifier, whether an indoor situation satisfies a predetermined condition for protection of a filter based on sensor information from at least one sensor,
    in response to a determination that the indoor situation satisfies the predetermined condition for protection of the filter:
        controlling, by the processor, the air purifier to suspend an air purifying function of the air purifier, and
        operating, by the processor, one or more ventilation devices,
    wherein operating the one or more ventilation devices comprises:
        transmitting, to a home server, a request for opening a window or a door, the home server being configured to control a window opening device configured to control the window or a door opening device configured to control the door,
        determining a location at which a predetermined substance is generated and a location of an opened window or door based on the sensor information,
        determining at least one of a blowing direction or a blowing intensity of an air circulator based on the location at which the predetermined substance is generated and the location of the opened window or door, the home server being further configured to control the air circulator, and
        transmitting a request for operating the air circulator to the air circulator or the home server, and
    wherein the request for operating the air circulator includes information about at least one of the determined blowing direction or the determined blowing intensity.

2. The method according to claim 1, wherein determining whether the indoor situation satisfies the predetermined condition for protection of the filter comprises:
    detecting whether at least one of cooking, cleaning, or smoking is performed, or whether an indoor air pollution level is greater than a threshold value.

3. The method according to claim 1, wherein the sensor information comprises at least one of image information, sound information, smoke detection information, gas usage information on a kitchen stove, flame or heat detection information on the kitchen stove, or indoor air pollution degree information.

4. The method according to claim 3, wherein determining whether the indoor situation satisfies the predetermined condition for protection of the filter comprises:
    providing the image information or the sound information as an input to an artificial neural network (ANN) that has been trained in advance to detect cooking, cleaning, or smoking events based on image data or sound data, and
    determining whether the indoor situation satisfies the predetermined condition for protection of the filter based on an output from the ANN.

5. The method according to claim 1, further comprising:
    obtaining, by the processor, a measurement of an indoor air pollution degree after operating the one or more ventilation devices; and
    in response to the indoor air pollution degree being lower than a reference value, by the processor, returning an operation of the one or more ventilation devices to an original state and restarting the air purifying function.

6. The method according to claim 5, further comprising:
    detecting, by the processor, a ventilation operation of a user based on the sensor information; and
    adjusting, by the processor, the reference value based on an indoor air pollution degree during the ventilation operation of the user.

7. The method according to claim 1, wherein determining whether the indoor situation satisfies the predetermined condition for protection of the filter comprises:
    receiving the sensor information from the at least one sensor; and
    based on the sensor information, determining a filter protection requirement level corresponding to the sensor information among a plurality of preset filter protection requirement levels.

8. The method according to claim 7, wherein determining the filter protection requirement level comprises:
    determining a plurality of events corresponding to the sensor information, each of the plurality of events being assigned to a preset score indicating a level of air pollution; and
    determining the filter protection requirement level by adding the preset scores corresponding to the determined plurality of events.

9. The method according to claim 1, wherein the predetermined substance includes chemicals, oil mist, smoke, and dust.

10. An air purifier comprising:
    a first airflow generator configured to generate an airflow such that outdoor air is introduced through a filter and filtered air is discharged;
    a second airflow generator that is configured to assist generation of the airflow passing through the filter in a first operation mode and that is configured to generate an airflow that does not pass through the filter in a second operation mode; and
    a controller configured to:
        receive sensor information including at least one of an image, a sound, or an air pollution degree of an indoor environment from at least one sensor,
        determine whether an indoor situation satisfies a predetermined condition for protection of the filter based on the sensor information,
        in response to a determination that the indoor situation satisfies the predetermined condition for protection of the filter:
            suspend an operation of the first airflow generator, and operate one or more ventilation devices or the second airflow generator in the second operation mode, determine a location at which a predetermined substance is generated and a location of an opened window or door based on the sensor information, determine at least one of a blowing direction or a blowing intensity of an air circulator based on the location at which the predetermined substance is generated and the location of the opened window or door, generate a request for performing a ventilation operation, the request including information about at least one of the determined blowing direction or the determined blowing intensity, and transmit the request for performing the ventilation operation to an external device, the external device comprising at least one of (i) the air circulator, (ii) a window opening device configured to open and close a window to introduce air from an outdoor into a room, or (iii) a door opening device configured to open and close a door to introduce air from the outdoor into the room.

11. The air purifier according to claim 10, wherein the controller is configured to detect whether at least one of cooking, cleaning, or smoking is performed, or whether an indoor air pollution is greater than a threshold value to thereby determine whether the indoor situation satisfies the predetermined condition.

12. The air purifier according to claim 10, wherein the at least one sensor comprises at least one of an image sensor, a sound sensor, an air pollution degree sensor, a smoke sensor, a gas flow sensor, a flame sensor, or a temperature sensor.

13. The air purifier according to claim 10, further comprising an artificial neural network (ANN) engine that has been trained in advance to detect cooking, cleaning, or smoking events based on image data or sound data, wherein the controller is further configured to:

provide the sensor information as an input to the ANN engine, and determine whether the indoor situation satisfies the predetermined condition for protection of the filter based on an output from the ANN engine.

14. The air purifier according to claim 10, further comprising a network interface configured to transmit the request for performing the ventilation operation to the external device.

15. The air purifier according to claim 10, wherein the controller is further configured to:

obtain a measurement of an indoor air pollution degree using an air pollution sensor after operating the one or more ventilation devices, and in response to the indoor air pollution degree being lower than a reference value, return an operation of the one or more ventilation devices to an original state and restart the first airflow generator.

16. The air purifier according to claim 15, wherein the controller is further configured to:

detect a ventilation operation of a user based on the sensor information, and adjust the reference value based on an indoor air pollution degree during the ventilation operation of the user.

17. The air purifier according to claim 10, wherein the controller is configured to, based on the sensor information, determine a filter protection requirement level corresponding to the sensor information among a plurality of preset filter protection requirement levels.

18. The air purifier according to claim 17, wherein the controller is configured to:

determine a plurality of events corresponding to the sensor information, each of the plurality of events being assigned to a preset score indicating a level of air pollution; and determine the filter protection requirement level by adding the preset scores corresponding to the determined plurality of events.

19. The air purifier according to claim 10, wherein the predetermined substance includes chemicals, oil mist, smoke, and dust.

* * * * *